Figure 1:
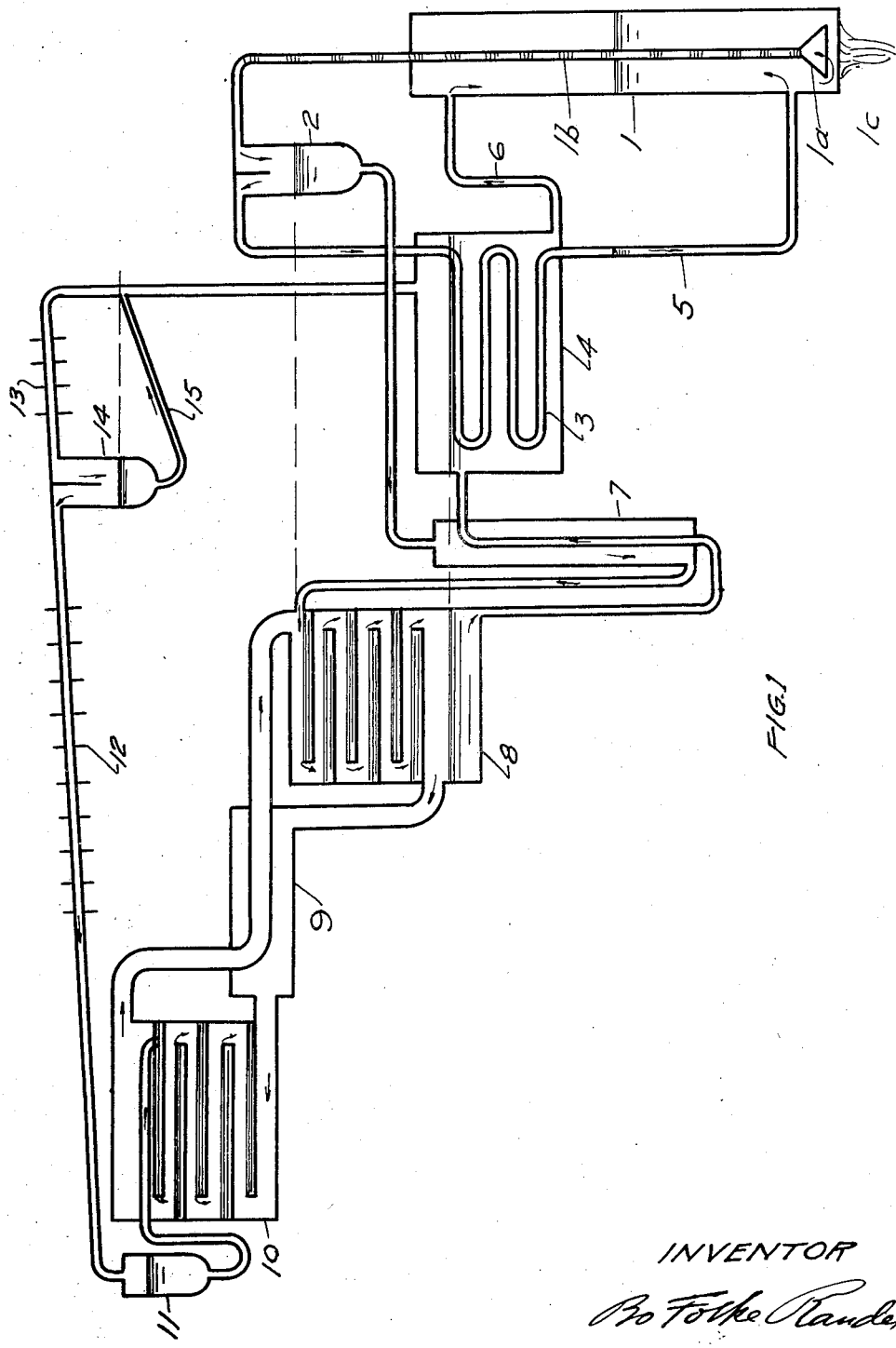

June 27, 1933. B. F. RANDEL 1,915,693

MEANS AND METHOD OF REFRIGERATION

Filed April 25, 1932

INVENTOR
Bo Folke Randel

Patented June 27, 1933

1,915,693

UNITED STATES PATENT OFFICE

BO FOLKE RANDEL, OF SAN DIEGO, CALIFORNIA

MEANS AND METHOD OF REFRIGERATION

Application filed April 25, 1932. Serial No. 607,348.

My invention relates to the art of refrigeration, more particularly to refrigerating apparatus of the absorption type and still more particularly to refrigerating apparatus wherein circulation of the fluids used therein is accomplished entirely by forces generated within the system. This invention is an improvement and modification of my invention as disclosed in co-pending application Serial No. 562,665, filed Sept. 14, 1931.

In my invention as described in application Serial No. 562,665, I cause complete vaporization of an absorbent and then condensation of the vapor produced, thus elevating the absorbent to a higher level, in order to enable same to flow by gravity through an absorber. In this application I show a modification, in that only part of the absorbent is vaporized, then by utilizing the principle of the common percolator, I cause this vapor to raise the remaining liquid to the higher elevation, from which point it flows by gravity through a similar absorber. The vapor is not condensed at the higher elevation, but is separated from the liquid to pass through the refrigerant generator, where its latent heat is transferred to the solution to evaporate the refrigerant out of same, the condensate being returned to the generator for absorbent or boiler, as I choose to call this part of the apparatus. In all other respects my present invention operates similar to the invention as described in application Serial No. 562,665.

In Fig. 1, I illustrate in diagrammatic form my invention. The different parts are shown somewhat different from similar parts illustrated in application Serial No. 562,665, but the general principle is the same. I may, in the main, use an apparatus as illustrated in application Serial No. 562,665, and choose to show a slightly modified structure in order to bring out the fact that the apparatus can be built in many different ways to do the same work. Each part is more or less conventionally shown and is known in the arts. I include in my invention any and all arrangements suitable to carry out my principle.

In the illustration, 1 is the absorbent boiler or generator with percolator 1a and percolator tube 1b. The boiler containing an absorbent, for instance, water, is heated by gas flame 1c. Any other heating means may be employed.

The vaporization of the water will cause rising of this vapor with the remaining liquid through percolator tube 1b to separator 2 where the liquid is separated from the vapor, which continues through coil 3 enclosed in refrigerant generator 4.

This refrigerant generator contains a solution of the absorbent and a gas for instance water and ammonia, and the heat in the water vapor will cause vaporization of the ammonia out of the solution. The vapor in coil 3 will thus condense and flow back to boiler through tube 5.

If the heat is maintained sufficiently high, substantially all the ammonia will be vaporized, so that the remaining fluid which passes over to boiler 1 through tube 6 will be pure absorbent or nearly so. However, even if all the refrigerant is not driven out and the liquid passing into boiler is a weak solution, it will not affect the working of the device. Any refrigerant present in boiler 1 will be vaporized, and by maintaining the temperature in separator 2 sufficiently high, this refrigerant will not be reabsorbed but will accompany the steam or vapor through coil 3, to be absorbed there and thence back to boiler 1. The liquid in separator 2 will be practically pure absorbent without refrigerant, and this is one of the objects of this invention.

This absorbent passes through heat exchanger 7 to deliver part of its heat to the solution arriving from absorber 8. The vaporized refrigerant passes upwards to condenser 12, where it is condensed and through liquid receiver 11 to evaporator 10. Evaporator 10 and absorber 8 are filled with inert gas, similar to evaporator and absorber in application No. 562,665. The actions in same are exactly similar to actions described in application Serial No. 562,665. Also the action in absorber 8 where the ammonia is absorbed, liberating the inert gas, returning same to the evaporator, is similar to action in absorber of application Serial No. 562,665.

Both absorbent and evaporator in this present application are fitted with trays, allowing large surfaces of the liquids to be exposed. Heat exchanger 9 is introduced as in the application Serial No. 562,665. Absorber is cooled in any suitable manner and the refrigeration produced in evaporator is used in any manner desired.

A customary rectifier 13 with separator 14 and return pipe 15 may be introduced between generator 3 and condenser 12, as in application Serial No. 562,665.

I have described my apparatus and the use of a pure substance as ammonia as refrigerant. However, I may use the same apparatus and employ a solution as refrigerant. In this case, not only the refrigerant, as ammonia, is evaporated in the refrigerant generator, but also part of the absorbent water. In the refrigerant condenser, this water vapor is condensed and in so doing will absorb the ammonia forming a super-rich solution to enter the evaporator. In this evaporator, the ammonia is evaporated out of the solution, producing refrigeration. The ammonia is then reabsorbed in the absorber and the inert gas liberated to pass back to the evaporator. The solution returns to refrigerant generator.

I claim:

1. That improvement in the art of refrigeration through the agency of an absorption system employing a refrigerant, an absorbent for said refrigerant and an inert gas as pressure equalizing agent which comprises vaporizing a part of the absorbent in an absorbent boiler and in heat exchange relation with a source of heat, causing said absorbent vapor to ascend and utilizing the internal force created by this action to elevate the remaining liquid absorbent to a higher position, separating the absorbent vapor from the absorbent liquid in a separating space, conducting the absorbent vapor to a refrigerant generator containing a solution of a refrigerant in the absorbent and causing evaporation of said refrigerant out of said absorbent by condensation of the absorbent vapor, conducting the resultant condensate and absorbent free of refrigerant to the absorbent boiler; condensing the refrigerant vapor and conducting the refrigerant liquid to an evaporating space, evaporating the liquid refrigerant in said evaporating space and in the presence of an inert gas producing a mixture of gases; conducting the liquid absorbent from the said separating space to an absorption space and in the presence of said mixture of gases, absorbing the refrigerant and liberating the inert gas, returning the resultant solution to the refrigerant generator and the inert gas to the said evaporator.

2. Absorption refrigerating apparatus comprising, in combination a boiler for partially vaporizing an absorbent, a separator, a lift pump to elevate the absorbent vapor and remaining absorbent liquid from the said boiler to said separator, a refrigerant generator, means to conduct absorbent vapor from said separator to said refrigerant generator and means to return absorbent condensate from said refrigerant generator back to said absorbent boiler, a refrigerant condenser, means to conduct vapor from said refrigerant generator to said refrigerant condenser, an absorber, an evaporator, means to conduct liquid from said separator to said absorber, means to conduct liquid from said refrigerant condenser to said evaporator, means to conduct gas from said evaporator to said absorber and other means to conduct gas from said absorber to said evaporator, means to conduct liquid from said absorber to said refrigerant generator and means to conduct liquid from said refrigerant generator to said absorbent boiler.

3. Absorption refrigerating apparatus comprising a boiler for partially vaporizing an absorbent, a separator, a thermostatic lift pump between said boiler and said separator, a refrigerant generator and heating means in said generator, means to conduct vapor from said separator to said heating means and further means to conduct condensate from said heating means back to said boiler.

4. That improvement in the art of refrigeration through the agency of an absorption system including an absorbent generator, a refrigerant generator, an absorbent separator, a refrigerant condenser, an absorber and an evaporator and containing a refrigerant and a liquid absorbent in which the refrigerant is dissolved, which consists in gasifying the refrigerant in its generator, partially gasifying the absorbent in its generator and out of communication with the refrigerant, causing the absorbent vapor with the remaining absorbent liquid to ascend by thermodynamic action to said separator, separating the absorbent liquid from the absorbent vapor, condensing the refrigerant and simultaneously conducting the absorbent liquid and liquefied refrigerant in parallel to the absorber and evaporator respectively.

5. That improvement in the art of refrigeration through the agency of an absorption system employing a refrigerant and an absorbent therefor, which consists in vaporizing the refrigerant and partially vaporizing the absorbent in heat exchange relation with sources of heat and in separate spaces, elevating the absorbent vapor and remaining absorbent liquid to a separating space, liquefying the gaseous refrigerant, evaporating the liquefied refrigerant in heat transfer relation with the objective of refrigeration and in the presence of an inert gas, introducing the mixture of evaporated refrigerant and inert gas into the presence of the absorbent liquid and thus absorbing the refrigerant and liberating the inert gas, returning the inert gas to the presence of the liquefied refrigerant and returning the separated absorbent liquid enriched with refrigerant to the said refrigerant vaporizing space and the absorbent from the said refrigerant vaporizing space to the said absorbent vaporizing space.

6. Absorption refrigerating apparatus comprising, in combination, a refrigerant generator, a rectifier, a refrigerant condenser, an evaporator and, in parallel with the above, an absorbent generator, an absorbent separator, an absorber, means to conduct liquid under influence of gravity from said rectifier back to said refrigerant generator, further means to conduct gas from said rectifier to said refrigerant condenser, means to conduct liquid from said refrigerant condenser to said evaporator, means to conduct vapor and liquid from said absorbent generator to said absorbent separator, means to conduct liquid under influence of gravity from said absorbent separator to said absorber, further means to conduct gas from said evaporator to said absorber and other means to conduct gas from said absorber to said evaporator, means to conduct liquid from said absorber to said refrigerant generator and liquid from said refrigerant generator to said absorbent generator, means to conduct vapor from said refrigerant generator to said rectifier, means to conduct vapor from said separator to said refrigerant generator and condensate from said refrigerant generator to said absorbent generator.

7. Absorption refrigerating apparatus comprising, in combination, a refrigerant generator and heating means in same, a refrigerant condenser, an evaporator, and, in parallel with the above, an absorbent generator, absorbent separator, an absorber and containing refrigerant fluid, absorption liquid and an auxiliary gas, means to conduct liquid from said refrigerant condenser to said evaporator, means to conduct liquid from said absorbent separator to said absorber, conduits connecting said evaporator and absorber, and arranged to permit circulation of said auxiliary gas between the evaporator and absorber due to force produced within the apparatus, means to conduct liquid from the said absorber to the said refrigerant generator, means to conduct liquid from said refrigerant generator to said absorbent generator, means to conduct vapors from said refrigerant generator to said refrigerant condenser, means to conduct vapor and liquid from said absorbent generator to said separator, means to conduct vapor from said separator to the heating means in said refrigerant generator and means to conduct condensate from said heating means to said absorbent generator.

8. That process of treating a solution of a refrigerant in a liquid absorption medium of higher boiling point than the refrigerant to produce refrigeration which comprises expelling the refrigerant from solution in heat exchange relation with a source of heat, partially vaporizing the liquid absorption medium out of communication with the refrigerant also in heat exchange relation with a source of heat, separating the remaining liquid absorption medium from the vaporized absorption medium condensing the refrigerant, evaporating the liquid refrigerant in heat exchange relation with the objective of refrigeration and in the presence of an auxiliary gas, circulating the auxiliary gas into the presence of the separated liquid absorption medium and back to the presence of the liquefied refrigerant to transfer the evaporated refrigerant to the presence of the absorption medium to be absorbed thereby, returning the solution thus formed to heat exchange relation with said first source of heat, and removing said absorption medium out of communication with said refrigerant.

9. That improvement in the art of refrigerating through the agency of an absorption system including a refrigerant generator, an absorbent generator, an absorber and an evaporator and containing a refrigerant and a liquid absorption medium in which the refrigerant is dissolved which consists in completely gasifying the refrigerant and partially gasifying the absorption medium in their respective generators, condensing the refrigerant, separating the liquid absorption medium from the vaporized absorption medium, simultaneously conducting the liquid absorption medium and liquefied refrigerant in parallel to the absorber and evaporator respectively, generating circulating force within the system, circulating an auxiliary gas through the evaporator and absorber due to said force and conducting enriched absorption medium from the absorber to the refrigerant generator and absorption medium from the refrigerant generator to the absorbent generator under the influence of gravity.

10. Absorption refrigerating apparatus comprising, in combination, two interconnected generators, one for absorbent and one for refrigerant, an absorber, an evaporator, an absorbent separator situated above said absorbent generator and above said absorber, a refrigerant condenser situated above said refrigerant generator and above said evaporator, means to conduct vapors and liquid of an absorption medium from said absorbent generator to said absorbent separator and means to conduct liquid from said absorbent separator to said absorber, means to conduct vapor of a refrigerant from said refrigerant generator to said refrigerant condenser and liquid from said refrigerant condenser to said evaporator, means to conduct gas from the said evaporator to the said absorber, and other means to conduct gas from said absorber to said evaporator, and means to conduct liquid from said absorber to said refrigerant generator, heating means in said refrigerant generator, means to conduct vapor from said separator to said heating means and liquid from said heating means to said absorbent generator and further means to conduct liquid between said two generators.

11. A method of refrigeration comprising evaporating a refrigerant from an absorption solution by heat application leaving a weakened absorption solution, condensing the refrigerant, vaporizing the condensed refrigerant in the presence of an inert fluid; removing the weak absorption solution from the point of heat application and partially vaporizing the weak solution by further application of heat, separating the remaining liquid from the vapor and out of communication with the refrigerant; conducting the liquid solution and the vaporized refrigerant in the presence of an inert fluid into contact with each other, absorbing the vaporized refrigerant by the solution and conducting the resulting strong solution to the original point of heat application.

12. A method of refrigeration comprising evaporating a refrigerating medium in solution with an absorption medium and a part of said absorption medium by heat application, condensing the said vaporized absorption medium and absorbing the said refrigerant vapor forming a super-strong solution, vaporizing the refrigerant out of the said super-strong solution in the presence of an inert fluid; removing the remaining liquid absorption medium from the point of heat application and partially vaporizing same by further application of heat, separating the then vaporized absorption medium from the remaining liquid and out of communication with the refrigerant; conducting the liquid absorption medium and the vaporized refrigerant in the presence of an inert fluid into contact with each other, absorbing the vaporized refrigerant by the liquid absorption medium and conducting the resulting strong solution to the original point of heat application.

13. That improvement in the art of refrigeration through the agency of an absorption system including an absorbent generator, a refrigerant generator, an absorbent separator, a refrigerant condenser, an absorber and an evaporator and containing a refrigerant and a liquid absorbent in which the refrigerant is dissolved, which consists in partially gasifying the absorbent in its generator and out of communication with the refrigerant, causing the absorbent vapor with the remaining absorbent liquid to ascend by thermodynamic action to said separator, separating the absorbent liquid from the absorbent vapor, conducting the absorbent vapor to the refrigerant generator and utilizing its latent heat to gasify the refrigerant, condensing the refrigerant and simultaneously conducting the absorbent liquid and liquefied refrigerant in parallel to the absorber and evaporator respectively.

14. That improvement in the art of refrigeration through the agency of an absorption system employing a refrigerant and an absorbent therefor, which consists in partially vaporizing the absorbent in heat exchange relation with a source of heat in an absorbent generator, elevating the absorbent vapor and remaining absorbent liquid to a separating space, utilizing the absorbent vapor as a source of heat to vaporize the refrigerant in a refrigerant generator, liquefying the gaseous refrigerant, evaporating the liquefied refrigerant in heat transfer relation with the objective of refrigeration and in the presence of an inert gas, introducing the mixture of evaporated refrigerant and inert gas into the presence of the absorbent liquid and thus absorbing the refrigerant and liberating the inert gas, returning the inert gas to the presence of the liquefied refrigerant and returning the separated absorbent liquid enriched with refrigerant to the said refrigerant generator and the absorbent from the said refrigerant generator to the said absorbent generator.

15. That process of treating a solution of a refrigerant in a liquid absorption medium of higher boiling point than the refrigerant to produce refrigeration which comprises expelling the refrigerant from solution in heat exchange relation with a source of heat, partially vaporizing the liquid absorption medium out of communication with the refrigerant also in heat exchange relation with a source of heat, separating the remaining liquid absorption medium from the vaporized absorption medium and utilizing the vapor as the said source of heat to expel the refrigerant from said solution, condensing the refrigerant, evaporating the liquid refrigerant in heat exchange relation with the objective of refrigeration and in the presence of an auxiliary gas, circulating the auxiliary gas into the presence of the separated liquid absorption medium and back to the presence of the liquefied refrigerant to transfer the evaporated refrigerant to the presence of the absorption medium to be absorbed thereby, returning the solution thus formed to heat exchange relation with said first source of heat, and removing said absorption medium out of communication with said refrigerant.

16. That improvement in the art of refrigerating through the agency of an absorption system including a refrigerant generator, an absorbent generator, an absorber and an evaporator and containing a refrigerant and a liquid absorption medium in which the refrigerant is dissolved which consists in completely gasifying the refrigerant and partially gasifying the absorption medium in their respective generators, condensing the refrigerant, separating the liquid absorption medium from the vaporized absorption medium, and utilizing the latent heat in said vapor for the said gasification of the refrigerant, simultaneously conducting the liquid absorption medium and liquefied refrigerant in parallel to the absorber and evaporator respectively, generating circulating force within the system, circulating an auxiliary gas through the evaporator and absorber due to said force and conducting enriched absorption medium from the absorber to the refrigerant generator and absorption medium from the refrigerant generator to the absorbent generator under the influence of gravity.

17. A method of refrigeration comprising evaporating a refrigerant from an absorption solution by heat application leaving a weakened absorption solution, condensing the refrigerant, vaporizing the condensed refrigerant in the presence of an inert fluid removing the weak absorption solution from the point of heat application and partially vaporizing the weak solution by further application of heat, separating the remaining liquid from the vapor and out of communication with the refrigerant, conducting the remaining vapor and utilizing the same as the source of heat to cause the said evaporating of a refrigerant from a solution, conducting the liquid solution and the vaporized refrigerant in the presence of an inert fluid into contact with each other, absorbing the vaporized refrigerant by the solution and conducting the resulting strong solution to the original point of heat application.

18. A method of refrigeration comprising partially vaporizing an absorbent, separating the absorbent vapor from the absorbent liquid, utilizing the latent heat in the said absorbent vapor to vaporize a refrigerant out of a solution, condensing the said refrigerant, vaporizing the said refrigerant liquid in the presence of an inert pressure equalizing vapor, forming a mixture of vapors, separating the said inert vapor from the said refrigerant vapor by absorbing the latter in the said absorbent liquid, returning said absorbent liquid with said refrigerant in solution to its point of vaporization and said absorbent to its point of vaporization, thus completing the cycle.

In testimony whereof, I have hereunto set my hand at San Diego, California, this 19th day of April, 1932.

BO FOLKE RANDEL.